US011629105B2

(12) United States Patent
Fowles et al.

(10) Patent No.: US 11,629,105 B2
(45) Date of Patent: Apr. 18, 2023

(54) PLANT TREATMENT COMPOSITION

(71) Applicant: Croda International Plc, East Yorkshire (GB)

(72) Inventors: Andrew Mark Fowles, Goole (GB); Chloe Rebecca King, Goole (GB)

(73) Assignee: CRODA INTERNATIONAL PLC, Goole (GB)

( * ) Notice: Subject to any disclaimer, the term of this patent is extended or adjusted under 35 U.S.C. 154(b) by 208 days.

(21) Appl. No.: 16/305,989

(22) PCT Filed: Jun. 2, 2017

(86) PCT No.: PCT/GB2017/051585
§ 371 (c)(1),
(2) Date: Nov. 30, 2018

(87) PCT Pub. No.: WO2017/208009
PCT Pub. Date: Dec. 7, 2017

(65) Prior Publication Data
US 2019/0144350 A1 May 16, 2019

(30) Foreign Application Priority Data
Jun. 2, 2016 (GB) .................... 1609677

(51) Int. Cl.
C05C 9/00 (2006.01)
A01N 47/28 (2006.01)
C05G 5/23 (2020.01)
A01N 25/04 (2006.01)
C05D 3/00 (2006.01)
C05D 5/00 (2006.01)
C05D 9/02 (2006.01)

(52) U.S. Cl.
CPC ............ *C05C 9/00* (2013.01); *A01N 25/04* (2013.01); *A01N 47/28* (2013.01); *C05D 3/00* (2013.01); *C05D 5/00* (2013.01); *C05D 9/02* (2013.01); *C05G 5/23* (2020.02)

(58) Field of Classification Search
CPC ........ A01N 25/04; A01N 47/28; A01N 59/06; A01N 59/16; A01N 47/30; A01N 59/20; C05G 5/23; C05C 9/00; C05D 3/00; C05D 5/00; C05D 9/02
See application file for complete search history.

(56) References Cited

U.S. PATENT DOCUMENTS

| | | | |
|---|---|---|---|
| 5,283,229 A | 2/1994 | Narayanan et al. | |
| 6,074,986 A * | 6/2000 | Mulqueen | A01N 25/02 424/405 |
| 6,255,350 B1 * | 7/2001 | Jon | A01N 37/00 514/588 |
| 2008/0307845 A1 * | 12/2008 | Marks | A01N 47/30 71/28 |
| 2019/0117552 A1 * | 4/2019 | Rautschek | A61K 8/34 |

FOREIGN PATENT DOCUMENTS

| | | | | |
|---|---|---|---|---|
| DE | 102015213635 | * | 7/2015 | ............... C05Q 5/00 |
| DE | 102015213635 A1 | * | 1/2017 | ............... C05G 5/00 |
| GB | 2522065 A | | 7/2015 | |
| GB | 2551269 A | | 12/2017 | |
| TW | 201200021 A | | 1/2012 | |
| WO | 2006134361 A2 | | 12/2006 | |
| WO | 2011157101 A1 | | 12/2011 | |
| WO | 2015107336 A1 | | 7/2015 | |

OTHER PUBLICATIONS

EPO Machine Translation of DE 102015213635 A1 (Year: 2020).*
Ele Corporation, "PEL-ALC Isotridecyl Alcohol Ethoxylate", Product Data Sheet, accessed from www.elecorporation.com (Year: 2020).*
Johansson, I. (2003). Amides, Fatty Acid. In Kirk-Othmer Encyclopedia of Chemical Technology, John Wiley & Sons, Inc (Ed.). doi: 10.1002/0471238961.0113090415161901.a01.pub2, accessed from https://onlinelibrary.wiley.com/doi/10.1002/0471238961.0113090415161901.a01.pub2 (Year: 2003).*
Mark Duffill, "Coconut Diethanolamide Allergy", 2008, accessed from www.dermnetnz.org https://dermnetnz.org/topics/coconut-diethanolamide-allergy/ (Year: 2016).*
PharmLab ("Emulsions: Preparation and Stabilization", 2017, accessed from https://pharmlabs.unc.edu/labs/emulsions/intro.htm (Year: 2009).*
Pubchem, "N,N-Dimethyldecanamide Depositor-Supplied Synonyms", 2020, accessed from https://pubchem.ncbi.nlm.nih.gov/compound/N_N-Dimethyldecanamide#section=Depositor-Supplied-Synonyms&fullscreen=true (Year: 2020).*
Milbradtetal, Machine Translation of DE 102015213635 A1 (Year: 2020).*
Sigma Aldrich ("N-Phenylurea", 2021, accessed from www.sigmaaldrich.com) (Year: 2021).*
Slomkowski, Stanislaw, et al. "Terminology of polymers and polymerization processes in dispersed systems (IUPAC Recommendations 2011)." Pure and Applied Chemistry 83.12 (2011): 2229-2259. (Year: 2011).*
BTC. "Sustainable Solvents" <https://www.btc-europe.com/fileadmin/user_upload/Downloads/Pdf_s/Industries/BTC_Folder_Sustainable_Solvents_RZ_Web.pdf> Nov. 22, 2014 (Year: 2014).*
BASF. "Core Products for Agrochemical Applications" <https://chemical.carytrad.com.tw/uploads/1/2/3/8/123848866/basf_-_2015-agro_brochure_asia_pacific_en.pdf> Jul. 2015 (Year: 2015).*
International Search Report and Written Opinion for International Application No. PCT/GB2017/051585, dated Aug. 4, 2017—7 pages.

(Continued)

*Primary Examiner* — Jennifer A Smith
(74) *Attorney, Agent, or Firm* — RatnerPrestia

(57) ABSTRACT

A plant treatment composition comprising: an aqueous phase comprising a plant nutrient; and an organic phase comprising a substituted urea or substituted thiourea compound, dissolved in an organic solvent; and an emulsifier; wherein the composition is in the form of an emulsion having droplets of the organic phase dispersed in the aqueous phase.

13 Claims, No Drawings

(56) References Cited

OTHER PUBLICATIONS

Stepan Company—Product Bulletin, Hallcomid® M-10, Jun. 2017, 2 pages (Extract).
Australian Examination Report for Australian Application No. 2017273140, dated Oct. 28, 2020, 5 pages.

* cited by examiner

PLANT TREATMENT COMPOSITION

CROSS REFERENCE TO RELATED APPLICATIONS

This application is the National Stage filing of International Appln. No. PCT/GB2017/051585, filed Jun. 2, 2017, and claims priority of GB Application No. 1609677.8, filed Jun. 2, 2016, the entirety of which applications is incorporated herein by reference for all purposes.

FIELD OF THE INVENTION

This invention relates to plant treatment compositions. In particular, though not exclusively, this invention relates to plant treatment compositions comprising one or more plant nutrients and one or more substituted urea or thiourea compounds.

BACKGROUND TO THE INVENTION

Plants, i.e. multicellular eukaryotes of the kingdom Plantae, need a range of nutrients for healthy growth. These include macronutrients such as nitrogen, phosphorus, potassium, carbon and water, secondary nutrients such as calcium, magnesium, sodium, chloride and sulphur, as well as micronutrients, which include copper, cobalt, iron, manganese, boron, molybdenum, zinc, silicon and nickel.

The introduction of secondary nutrients and micronutrients into plants can be difficult. Even though they may be present in significant quantities in the soil, their availability to plants may be low. Furthermore, such nutrients may not be sufficiently mobilised within plants, which may lead to local areas of nutrient deficiency within a plant.

Calcium ($Ca^{2+}$) is a secondary nutrient that is important in maintaining cell wall strength and membrane integrity. Both of these properties are essential in ensuring quality of crops, in particular fruit and vegetables crops, and in providing and maintaining adequate shelf life. Due to a plant's physiology, environment or growing conditions calcium distribution in the plant can be uneven, with areas of localized insufficiency. A plant as a whole may not be calcium deficient, but some part of that plant may be low in calcium, causing difficulties to that specific part of the plant. This may occur as calcium uptake and movement within a plant is erratic, with the calcium moving passively through the plant's transpiration stream. This limits the throughput of calcium in areas with low water loss.

Certain substituted urea and thiourea compounds have been shown to work synergistically with plant nutrients. WO2006/134361A2 discloses a composition that aids calcium uptake and mobilisation by combining a water-soluble salt of calcium with an auxin mimic that is an aryl substituted urea. WO2015/107336A1 discloses an agrochemical composition said to increase utilisation of magnesium in plants by combining magnesium and/or iron with certain substituted urea or thiourea compounds and a glutamic acid compound.

One substituted urea compound that has been found to be effective in combination with plant nutrients is diphenyl urea (DPU).

DPU is classified as a cytokinin. Cytokinins are a class of plant growth substances that promote cell division, or cytokinesis, in plant roots and shoots. They are involved primarily in cell growth and differentiation, but also affect apical dominance, axillary bud growth, and leaf senescence.

The example of DPU illustrates that substituted urea and thiourea compounds can have useful plant treatment effects when applied in combination with plant nutrients. There is hence a desire to formulate such compounds with plant nutrients.

However, formulations of such compounds suffer from precipitation and a resulting lack of homogeneity. For example, DPU is typically added to aqueous plant nutrient formulations as a solution in a polar solvent, e.g. ethanol. These solvents are miscible with water, and so when the solution of DPU is added to the aqueous nutrient formulation, the solvent partitions into the water causing the solubility of the substituted urea to decrease. This can lead to precipitation of the DPU out of solution, resulting in a cloudy formulation with scum and/or sediment, a problem that is exacerbated by the presence of plant nutrients, e.g. calcium, in the aqueous composition. Precipitation of DPU affects the homogeneity of the solution and may lead to undesirably high or low concentrations of DPU where the composition is used in batches.

There is hence a need in the art for improved plant treatment compositions comprising one or more plant nutrients and one or more substituted urea or thiourea compounds.

It is an object of the present invention to address one or more of the above problems and/or at least one other problem associated with the prior art.

STATEMENTS OF THE INVENTION

A first aspect of the invention provides a plant treatment composition comprising: an aqueous phase comprising a plant nutrient; and an organic phase comprising a substituted urea or substituted thiourea compound, dissolved in an organic solvent; and an emulsifier; wherein the composition is in the form of an emulsion having droplets of the organic phase dispersed in the aqueous phase.

It has been found that substituted urea or thiourea compounds may be more readily incorporated into aqueous compositions, in particular those comprising plant nutrients, when they are dissolved within a dispersed organic phase. In this manner plant treatment compositions having improved stability and/or increased concentrations of substituted urea or thiourea compound can be provided.

The aqueous phase may in principle be any suitable solution comprising water and at least one plant nutrient therein. Advantageously, the aqueous phase may comprise a plurality of plant nutrients.

Examples of suitable plant nutrients include, without limitation secondary nutrients, for example calcium, magnesium, sodium, chloride and sulphur, as well as micronutrients, for example copper, cobalt, iron, manganese, boron, molybdenum, zinc, silicon and nickel.

The plant nutrient(s) may advantageously be water-soluble. In particular, the plant nutrient(s) may advantageously be dissolved in the aqueous phase. Additionally or alternatively one or more water-insoluble plant nutrients may be present in the aqueous phase as a suspension of solid particles.

Plant nutrient materials may advantageously be introduced as water-soluble salts. Suitably the water-soluble salt of a nutrient mineral is a water-soluble salt of another secondary nutrient, such as calcium, magnesium, sodium, chloride and sulphur, or a micronutrient, in particular, copper, cobalt, iron, manganese, boron, molybdenum, zinc, silicon and nickel. Particular examples of water-soluble nutrient salts for inclusion in the invention include nitrates, sulphates and chlorides. Specific examples include calcium nitrate, zinc nitrate, iron sulphate, zinc sulphate, magnesium sulphate, manganese sulphate, iron nitrate or manganese nitrate. Nutrients may optionally be present in chelated form. Chelated nutrients are known in the art, for example based on ethylenediaminetetraacetic acid (EDTA) as chelating agent.

Suitably, the plant treatment composition may comprise at least 0.01% w/w, optionally at least 0.1% w/w, or even at least 1% w/w of any of the nutrients listed above, based on the total weight of the plant treatment composition. Nutrient concentrations may be measured by Inductively Coupled Plasma Mass Spectrometry (ICP-MS).

The concentration of the plant nutrients in the aqueous phase, and the plant treatment composition as a whole, may be chosen in accordance with a desired application of the plant treatment composition.

Suitably, the plant treatment composition may comprise at least 1% w/w calcium, optionally at least 2% w/w calcium, or even at least 5% w/w calcium, based on the total weight of the plant treatment composition. In some embodiments, the plant treatment composition comprises in the range of from 1% to 20% w/w calcium, in particular in the range of from 2% to 15% w/w calcium, such as in the range of from 5% to 11% w/w calcium, based on the total weight of the plant treatment composition. Advantageously, the calcium may be in the form of ions from a water-soluble calcium salt dissolved in the aqueous phase.

Suitably, the plant treatment composition may comprise at least 0.1% w/w magnesium, optionally at least 1% w/w magnesium, or even at least 2% w/w magnesium. In some embodiments, the plant treatment composition comprises in the range of from 0.1% to 20% w/w magnesium, in particular in the range of from 0.5% to 15% w/w magnesium, such as in the range of from 0.8% to 10% magnesium, based on the total weight of the plant treatment composition. In some embodiments, the plant treatment composition comprises in the range of from 0.1% to 5% w/w magnesium, in particular in the range of from 0.5% to 4% w/w magnesium, such as in the range of from 0.8% to 3% magnesium, based on the total weight of the plant treatment composition. In some embodiments, the plant treatment composition comprises in the range of from 1% to 20% w/w magnesium, in particular in the range of from 2% to 15% w/w magnesium, such as in the range of from 5% to 11% magnesium, based on the total weight of the plant treatment composition. Advantageously, the magnesium may be in the form of ions from a water-soluble magnesium salt dissolved in the aqueous phase.

Suitably, the plant treatment composition may comprise at least 0.1% w/w zinc, optionally at least 0.5% w/w zinc, or even at least 0.8% w/w zinc. In some embodiments, the plant treatment composition comprises in the range of from 0.1% to 5% w/w zinc, in particular in the range of from 0.5% to 3% w/w zinc, such as in the range of from 0.8% to 2% zinc, based on the total weight of the plant treatment composition. Advantageously, the zinc may be in the form of ions from a water-soluble zinc salt dissolved in the aqueous phase.

Suitably, the plant treatment composition may comprise at least 0.1% w/w iron, optionally at least 0.5% w/w iron, or even at least 0.8% w/w iron. In some embodiments, the plant treatment composition comprises in the range of from 0.1% to 5% w/w iron, in particular in the range of from 0.5% to 3% w/w iron, such as in the range of from 0.8% to 2% iron, based on the total weight of the plant treatment composition. Advantageously, the iron may be in the form of ions from a water-soluble iron salt dissolved in the aqueous phase.

The aqueous phase may also comprise one or more acids, in particular nitric acid and/or a weak acid. As used herein, the expression "weak acid" refers to a weak organic acid such as acetic acid, citric acid, humic acid, fulvic acid or propanoic acid. The applicants have found that the presence of these acids improves the uptake of nutrients, and particularly nitrogen and secondary or micronutrients, by plants. As a result, the inclusion of these acids brings about beneficial effects. These may include the enhancement of plant growth. More typically, the treatment will improve the quality of plant growth, and specifically the type of growth or growth habit may be enhanced as required. Generally, the nutrient content of the plant will be improved as a result of better nutrient uptake and distribution.

The concentration of the acid in the aqueous phase, and the plant treatment composition as a whole, may be chosen in accordance with a desired application of the plant treatment composition. The amount of acid, e.g. weak acid, may suitably be an amount of from 0.05 to 3% w/w, based on the total weight of the plant treatment composition, for example at about 1% w/w. These relatively small quantities are sufficient to lower the pH of the composition sufficiently to provide for the advantages discussed above.

Optionally, the pH of the plant treatment composition may be acidic, for example in the range of from 1 of 4, in particular in the range of from 1.5 to 3.5, such as in the range of 2 to 3.

The aqueous phase may also comprise one or more suitable additives. Examples include, without limitation, thickeners, colourants and anti-foaming agents. Conveniently, beet molasses may be used as a colourant and a source of plant sugars.

Additives, such as thickeners, colourants or anti-foaming agents may optionally be present at a concentration in the range of 0.01 to 5.00% w/w, for example in the range of 0.1 to 1% w/w, e.g. about 0.5% w/w, based on the total weight of the plant treatment composition.

The organic phase may in principle be any suitable solution comprising one or more substituted urea or substituted thiourea compounds, dissolved in an organic solvent.

A wide range of substituted urea and thiourea compounds are known in the art to be useful for treating plants. Advantageously, the substituted urea or thiourea compound may aid uptake or mobilisation in plants of one or more of the nutrients in the aqueous phase, in particular calcium. Alternatively, the substituted urea or thiourea compound may have a plant treatment effect that is unrelated to the aqueous phase.

Suitably, the organic phase may comprise one or more compounds of Formula I:

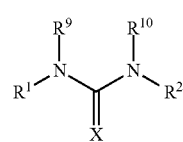

Formula I wherein:

X is selected from O and S $R^1$ and $R^2$ together form a cyclic alkyl group substituted with 0-3 $R^6$, or are independently selected from aryl substituted with 0-3 $R^6$, $C_{3-10}$ cycloalkyl substituted with 0-3 $R^6$, a 5-10 membered heterocyclic ring system containing 1-4 heteroatoms independently selected from N, S, and O substituted with 0-3 $R^6$, —$(CH_2)_{1-3}R^3R^4$; —C(=O)$R^8$, —$(CH_2)_{0-5}CH_3$, —$(CH_2)_{0-5}O(CH_2)_{0-5}CH_3$, —$(CH_2)_{0-6}$—OH, —$(CH_2)_{0-6}$—$NH_2$, —$(CH_2)_{0-6}$—$CO_2R^5$, and H provided that at least one of $R_1$ and $R_2$ is not H;

$R^3$ is selected from aryl substituted with 0-3 $R^6$, $C_{3-10}$ cycloalkyl substituted with 0-3 $R^6$, a 5-10 membered heterocyclic ring system containing 1-4 heteroatoms independently selected from N, S, and O substituted with 0-3 $R^6$;

$R^4$ is selected from aryl substituted with 0-3 $R^6$, $C_{3-10}$ cycloalkyl substituted with 0-3 $R^6$, a 5-10 membered heterocyclic ring system containing 1-4 heteroatoms independently selected from N, S, and O substituted with 0-3 $R^6$, —$(CH_2)_{0-5}CH_3$, —$(CH_2)_{0-5}O(CH_2)_{0-5}CH_3$, —$(CH_2)_{0-6}$—OH, —$(CH_2)_{0-6}$—$NH_2$, and —$(CH_2)_{0-6}$—$CO_2R^5$;

$R^5$ is selected from H and $C_{1-6}$ alkyl;

each $R^6$ is independently selected from H, F, Br, Cl, I, $C_{1-4}$ alkyl, phenyl, $CH_2OH$, $CH_2OCH_3$; $C_1$-$C_4$ alkoxy, $C_1$-$C_4$ haloalkyl, —$NR^7R^8$, —C(=O)$R^8$, $CH_2COOR^8$, or $OR^8$;

each $R^7$ and $R^8$ is independently selected from H and $C_{1-4}$ alkyl; and each $R^9$ and $R^{10}$ is independently selected from C(=O)$R^8$, —$(CH_2)_{0-5}CH_3$, —$(CH_2)_{0-5}O(CH_2)_{0-5}CH_3$, —$(CH_2)_{0-6}$—OH, —$(CH_2)_{0-6}$—$NH_2$, —$(CH_2)_{0-6}$—$CO_2R^5$, H, F, Br, Cl, I, phenyl, $C_1$-$C_4$ alkoxy, $C_1$-$C_4$ haloalkyl.

In some embodiments, the organic phase may comprise one or more compounds of Formula I wherein:

X is selected from O and S $R^1$ and $R^2$ are independently selected from aryl substituted with 0-3 $R^6$, a 5-10 membered heterocyclic ring system containing 1-4 heteroatoms independently selected from N, S, and O substituted with 0-3 $R^6$, —$(CH_2)_{1-3}R^3R^4$; —C(=O)$R^8$, —$(CH_2)_{0-5}CH_3$, and H provided that at least one of $R_1$ and $R_2$ is not H;

$R^3$ is selected from aryl substituted with 0-3 $R^6$, and a 5-10 membered heterocyclic ring system containing 1-4 heteroatoms independently selected from N, S, and O substituted with 0-3 $R^6$;

$R^4$ is selected from aryl substituted with 0-3 $R^6$, a 5-10 membered heterocyclic ring system containing 1-4 heteroatoms independently selected from N, S, and O substituted with 0-3 $R^6$, and —$(CH_2)_{0-5}CH_3$;

each $R^6$ is independently selected from H, F, Br, Cl, I, $C_{1-4}$ alkyl, phenyl, $CH_2OH$, $CH_2OCH_3$; $C_1$-$C_4$ alkoxy, $C_1$-$C_4$ haloalkyl, —$NR^7R^8$, —C(=O)$R^8$, $CH_2COOR^8$, or $OR^8$;

each $R^7$ and $R^8$ is independently selected from H and $C_{1-4}$ alkyl; and each $R^9$ and $R^{10}$ is independently selected from C(=O)$R^8$, —$(CH_2)_{0-5}CH_3$, —$(CH_2)_{0-5}O(CH_2)_{0-5}CH_3$, —$(CH_2)_{0-6}$—OH, —$(CH_2)_{0-6}$—$NH_2$, —$(CH_2)_{0-6}$—$CO_2R^5$, H, F, Br, Cl, I, phenyl, $C_1$-$C_4$ alkoxy, $C_1$-$C_4$ haloalkyl.

In some embodiments, the organic phase may comprise one or more compounds of Formula I wherein:

X is selected from O and S $R^1$ and $R^2$ are independently selected from aryl substituted with 0-3 $R^6$, and a 5-10 membered heterocyclic ring system containing 1-4 heteroatoms independently selected from N, S, and O substituted with 0-3 $R^6$;

each $R^6$ is independently selected from H, F, Br, Cl, I, $C_{1-4}$ alkyl, phenyl, $CH_2OH$, $CH_2OCH_3$; $C_1$-$C_4$ alkoxy, $C_1$-$C_4$ haloalkyl, —$NR^7R^8$, —C(=O)$R^8$, $CH_2COOR^8$, or $OR^8$; and each $R^9$ and $R^{10}$ is H.

In some embodiments, the organic phase may comprise one or more compounds of Formula I wherein:

X is selected from O and S $R^1$ and $R^2$ are independently selected from aryl substituted with 0-3 $R^6$;

each $R^6$ is independently selected from H, F, Br, Cl, I, $C_{1-4}$ alkyl, phenyl, $CH_2OH$, $CH_2OCH_3$; $C_1$-$C_4$ alkoxy, $C_1$-$C_4$ haloalkyl, —$NR^7R^8$, —C(=O)$R^8$, $CH_2COOR^8$, or $OR^8$; and each $R^9$ and $R^{10}$ is independently selected from C(=O)$R^8$, —$(CH_2)_{0-5}CH_3$, —$(CH_2)_{0-5}O(CH_2)_{0-5}CH_3$, —$(CH_2)_{0-6}$—OH, —$(CH_2)_{0-6}$—$NH_2$, —$(CH_2)_{0-6}$—$CO_2R^5$, H, F, Br, Cl, I, phenyl, $C_1$-$C_4$ alkoxy, $C_1$-$C_4$ haloalkyl, $C_1$-$C_4$ alkyl.

Examples of compounds of Formula I include: diphenyl urea, 2-nitro diphenyl urea, mono- or di-methyl diphenyl urea, mono- or di-ethyl diphenyl urea, thidiazuron, N,N'-bis(hydroxymethyl) urea, N-phenyl urea, tetramethyl urea, N,N'-dicyclohexyl urea, N.N'-diphenyl thiourea, N.N'-trimethylene urea, 1,3-diethyl-1,3-diphenyl urea, 1,3-diethyl urea, N,N'-dibutylthio urea, chloro-pyridyl-phenyl urea, and N,N-diformyl urea.

Suitably, the organic phase may comprise an unsymmetrically or symmetrically substituted aryl urea or thiourea, e.g. an unsymmetrically or symmetrically substituted aryl urea according to Formula I.

A particularly advantageous substituted aryl urea is diphenyl urea (DPU), which is regarded as a synthetic cytokinin and has been found to aid uptake and mobilisation of nutrients, in particular calcium in plants.

Suitably, the plant treatment composition may comprise at least 5 ppm substituted urea or substituted thiourea compound (e.g. said compound of Formula I), optionally at least 10 ppm substituted urea or substituted thiourea compound, or even at least 50 ppm substituted urea or substituted thiourea compound, based on the total weight of the plant treatment composition.

In some embodiments, the plant treatment composition comprises in the range of from 5 to 2000 ppm of said substituted urea or substituted thiourea compound, in particular in the range of from 20 to 1000 ppm substituted urea or substituted thiourea compound, such as in the range of from 50 to 400 ppm substituted urea or substituted thiourea compound, based on the total weight of the plant treatment composition.

The plant treatment composition may also comprise a combination of two or more of the substituted urea or substituted thiourea compounds in the above amounts.

The organic solvent of the organic phase may be any solvent that is, on the one hand, capable of solubilising the substituted urea or substituted thiourea compound and, on the other hand, is capable of forming a dispersed phase in water. Polar solvents such as ethanol cannot form a dispersed phase of droplets in water since they are too miscible.

Suitably, the organic solvent may have a solubility (if any) in water of less than 10 g/L, in particular less than 5 g/L, advantageously less than 2 g/L, as determined according to OECD test method 105, 1995.

The organic solvent may suitably comprise or consist of solvent molecules comprising a chain of at least four consecutive carbon atoms, advantageously at least eight consecutive carbon atoms, or even at least ten consecutive carbon atoms.

The solvent may advantageously comprise or consist of an alkyl amide. Suitably, the alkyl amide may be a compound of Formula II:

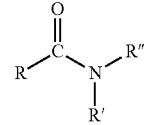

Formula II wherein:

R' and R" are each independently selected from hydrogen and $C_{1-4}$ alkyl

R is $C_{4-14}$ alkyl, optionally $C_{8-12}$ alkyl, suitably $C_{10}$ alkyl.

Suitably, the alkyl amide may have in the range of from 6 to 18 carbon atoms, in particular 10 to 14 carbon atoms. Advantageously, the alkyl amide may be a N,N-dimethyl amide. In an embodiment, the organic amide is N,N-dimethyl decanamide. This compound is commercially available as AGNIQUE® AMD 10 and has been found to offer outstanding solubilising performance for a range of substituted urea and substituted thiourea compounds, whilst having a water solubility of less than 1 g/L.

The emulsifier comprises one or more surfactants for dispersing droplets of the organic phase in the aqueous phase. The nature of the surfactant and its concentration may be chosen based on the nature of the organic and aqueous phases, as well as the desired properties of the plant treatment composition.

In an embodiment, the surfactant may have a hydrophilic-lipophilic balance in the range of from 12 to 18, optionally in the range of from 14 to 15.

Suitably, the surfactant may comprise an alkoxylated, in particular ethoxylated fatty amine and/or fatty alcohol. The fatty amine and/or fatty alcohol may suitably comprise at least ten carbon atoms prior to alkoxylation.

In an embodiment, the alkoxylated fatty amine comprises alkoxylated, in particular ethoxylated, coca amine. Suitably, the average ethylene oxide chain length may be in the range of from 8 to 15, in particular about 12. Such an emulsifier is commercially available under the trade name LUTENSOL® FA12K from BASF.

In an embodiment, the alkoxylated fatty alcohol comprises alkoxylated, in particular ethoxylated, isotridecyl alcohol. Suitably, the average ethylene oxide chain length may be in the range of from 8 to 15, in particular about 12. Such an emulsifier is commercially available under the trade name ATLOX® 4991 from Croda.

The plant treatment composition is in the form of an emulsion having droplets of the organic phase dispersed in the aqueous phase. Advantageously, the (average) droplet size may be less than 200 nm, in particular less than 100 nm, or even less than 80 nm. Advantageously, the emulsion may be substantially stable such that no phase separation occurs over a period of at least 1 week, preferably at least 2 weeks. Emulsions with droplet sizes below 100 nm generally appear translucent. This property is due to the fact that light waves are scattered by the droplets only if their sizes exceed about one-quarter of the wavelength of the incident light.

In an embodiment, the emulsion constituting the plant treatment composition is a microemulsion, i.e. a thermodynamically stable emulsion.

The ratio of aqueous phase to organic phase may be chosen consistent with providing a desired plant treatment composition. Suitably, the ratio of aqueous phase to organic phase may be in the range of from 999:1 to 1:1, such as in the range of from 199:1 to 9:1, or even 99:1 to 9:1 by weight.

In an embodiment, the composition comprises: in the range of from 4 to 6% w/w calcium (based on the total weight of the composition) in the aqueous phase and in the range of from 10 to 300 ppm diphenyl urea (based on the total weight of the composition) in the organic phase. The organic solvent comprises an alkyl amide, e.g. as described anywhere herein and the emulsifier comprises an alkoxylated fatty alcohol, e.g. as described anywhere herein.

In an embodiment, the composition comprises: in the range of from 4 to 6% w/w calcium (based on the total weight of the composition) in the aqueous phase and in the range of from 10 to 300 ppm diphenyl urea (based on the total weight of the composition) in the organic phase. The organic solvent comprises an alkyl amide, e.g. as described anywhere herein and the emulsifier comprises an alkoxylated fatty amine, e.g. as described anywhere herein.

In an embodiment, the composition comprises: in the range of from 8 to 12% w/w calcium (based on the total weight of the composition) in the aqueous phase and in the range of from 10 to 300 ppm diphenyl urea (based on the total weight of the composition) in the organic phase. The organic solvent comprises an alkyl amide, e.g. as described anywhere herein and the emulsifier comprises an alkoxylated fatty alcohol, e.g. as described anywhere herein.

A second aspect of the invention provides a method of making a plant treatment composition, suitably a plant treatment composition according to any aspect or embodiment of the invention, the method comprising dissolving one or more substituted ureas or substituted thioureas in an organic solvent to form an organic phase; and dispersing droplets of the organic phase in an aqueous phase comprising a plant nutrient.

The organic and aqueous phases, and each of their constituents, may be as described herein in respect of the first aspect of the invention.

A third aspect of the invention provides a method of enhancing crop yield in a plant, the method comprising applying to said plant a composition according to the first aspect of the invention, or an aqueous dilution thereof.

A fourth aspect of the invention provides a method of treating a plant, the method comprising applying a composition according to the first aspect of the invention, or an aqueous dilution thereof, to the plant.

Suitably, the composition or dilution may be applied as a foliar spray. A dilution of the composition may suitably comprise at least 50 parts of water to one part of composition, advantageously in the range of from 100 parts to 300 parts of water to one part of composition.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property then a range of values defined by a combination of any of the upper limits with any of the lower limits may also be implied.

In this specification—unless stated otherwise—properties are measured under standard temperature and pressure.

The present invention will now be further described with reference to the following non-limiting examples.

Component Screening

Table 1 shows the results of testing solvents for ability to dissolve diphenyl urea (DPU).

TABLE 1

| Solvent Name | Chemistry | DPU Solubility comments |
| --- | --- | --- |
| AGNIQUE ® AMD10 | Capric acid dimethylamide | Up to 10% w/w at +3° C. |
| AGNIQUE ® AMD810 | Capryl/capric acid dimethylamide | Similar to AMD10 |
| DOWANOL ™ DPnB | Dipropylene glycol n-Butyl ether | Slight solubility (<1% w/w) |
| AGNIQUE ® AE-3 2-EH | 2-Ethylhexyl lactate | Slight solubility (<1% w/w) |
| 1-Decyl-2-pyrrolidone | 1-decyl-2-pyrrolidone | >2% w/w |
| 1-Dodecyl-2-pyrrolidone | 1-dodecyl-2-pyrrolidone | >2% w/w |
| DOWANOL ™ TPnB | Tripropylene glycol n-Butyl ether | Effectively insoluble |
| DOWANOL ™ PPh | 1-phenoxypropan-2-ol | Effectively insoluble |
| SYNATIVE ® ES EHK | Ethylhexylcocoate | Effectively insoluble |
| CETIOL ® B | Dibutyladipate | Effectively insoluble |
| AGNIQUE ® M18 RD-F | Rapeseed oil methyl ester | Effectively insoluble |
| AGNIQUE ® ME890 | Methyl octanoate | Effectively insoluble |
| SOLVESSO ™ 100ND | Aromatic hydrocarbon (distillate) | Effectively insoluble |
| SOLVESSO ™ 150ND | Aromatic hydrocarbon (distillate) | Effectively insoluble |
| SOLVESSO ™ 200ND | Aromatic hydrocarbon (distillate) | Effectively insoluble |

Resultant DPU solutions were emulsified with an aqueous nutrient formulation using Atlox® 4991 (Isotridecyl alcohol ethoxylated with 12 units of ethylene oxide). It was found that AGNIQUE® AMD810 and DOWANOL® DPnB led to crystallisation of DPU on emulsification. This can be attributed to the high water solubility of these solvents, shown in Table 2.

TABLE 2

| Solvent Name | Chemistry | Water solubility (OECD 105) |
| --- | --- | --- |
| AGNIQUE ® AMD10 | Capric acid dimethylamide | 0.574 g/L |
| AGNIQUE ® AMD810 | Capryl/capric acid dimethylamide | 4.20 g/L |
| DOWANOL ™ DPnB | Dipropylene glycol n-Butyl ether | 104 g/L |
| AGNIQUE ® AE-3 2-EH | 2-Ethylhexyl lactate | immiscible |
| N-octylpyrrolidone | | <2 g/L |
| N-dodecylpyrrolidone | | <2 g/L |

AGNIQUE® AMD10 was chosen as the most viable solvent. The solubility of other substituted ureas and substituted thioureas was tested in this solvent. The results are shown in Table 3:

TABLE 3

| Urea derivative | Fully Soluble in AGNIQUE ® AMD10? (2% w/w urea derivative) | Emulsion with ATLOX ® 4991 stable? (4 wks ambient) |
| --- | --- | --- |
| N,N'-bis(hydroxymethyl) urea | No | N/A |
| N-phenyl urea | Yes | Yes |
| Tetramethyl urea | Yes | Yes |
| N,N'-dicyclohexyl urea | No | N/A |
| N,N'-diphenylthiourea | Yes | Yes |
| N,N'-trimethylene urea | No | N/A |
| 1,3-diethyl-1,3-diphenyl urea | Yes | Yes |
| 1,3-diethylurea | Yes | Yes |
| N,N'-dibutylthiourea | Yes | Yes |

Although N,N'-bis(hydroxymethyl) urea, N,N'-dicyclohexyl urea and N,N'-trimethylene urea displayed some solubility, this was not enough to achieve a concentration of 2% w/w.

EXAMPLE 1

Analysis: 5% w/w Ca, 100 ppm DPU

Sample A: DPU (1 g) was dissolved in AGNIQUE® AMD10 (99 g) to give a 1% w/w solution of DPU. To the 1% w/w solution of DPU (30.5 g of) was added ATLOX® 4991 (45.8 g) to give a 0.4% w/w DPU concentrate.

Sample B: A calcium nitrate/zinc nitrate base was made to the composition below:

| Component | Mass/g |
| --- | --- |
| Water | 784.9 |
| Zinc Oxide | 16.5 |
| Nitric acid (70%) | 33.9 |
| Citric acid | 2.0 |
| Calcium nitrate (industrial) | 335 |
| Molasses | 10.1 |

Calcium nitrate (Industrial) is industrial grade calcium nitrate fertiliser, which is a mix of calcium and ammonium nitrates containing approximately 18.6% w/w calcium.

To make the finished formulation, Sample A (30 g) was added with stirring to Sample B (1186 g).

Result: An emulsion was formed. However this formulation did not give complete stability (i.e. the solution was cloudy) and some phase separation occurred ° C.

EXAMPLE 2

Analysis: 5% w/w Ca, 100 ppm DPU

Sample C: DPU (0.12 g) was dissolved in AGNIQUE® AMD10 (11.88 g) and LUTENSOL® FA12K (18.0 g) to give a 0.4% w/w DPU concentrate.

Sample D: A calcium nitrate/zinc nitrate base was made to the composition below:

| Component | Mass/g |
| --- | --- |
| Water | 784.9 |
| Zinc Oxide | 16.5 |
| Nitric acid (70%) | 33.9 |
| Citric acid | 2.0 |
| Calcium nitrate (industrial) | 335 |
| Molasses | 10.1 |

To make the finished formulation, Sample C (30 g) was added with stirring to Sample D (1186 g).

Result: The finished formulation formed an emulsion, which remained clear and homogeneous after 2 weeks storage between +3° C. and +50° C.

EXAMPLE 3

Analysis: 9.5% w/w Ca, 100 ppm DPU

Sample E: DPU (1 g) was dissolved in AGNIQUE AMD10 (99 g) to give a 1% w/w solution of DPU. To the 1% w/w solution of DPU (30.5 g of) was added ATLOX® 4991 (45.8 g) to give a 0.4% w/w DPU concentrate.

Sample F: A calcium nitrate/zinc nitrate base was made to the composition below:

| Component | Mass/g |
| --- | --- |
| Water | 595 |
| Zinc Oxide | 14.3 |
| Nitric acid (70%) | 31.3 |
| Calcium nitrate (industrial) | 734.4 |
| Molasses | 7.0 |

To make the finished formulation, Sample E (30 g) was added with stirring to Sample F (1382 g).

Result: The finished formulation formed an emulsion, which remained homogeneous and almost clear during 2 weeks storage between −18 and +40° C.

EXAMPLE 4

Analysis: 10.5% w/w Ca, 200 ppm DPU

Sample G: DPU (0.8 g) was dissolved in AGNIQUE® AMD10 (39.2 g) and ATLOX® 4991 (60.0 g) to give a 0.8% w/w DPU concentrate.

Sample H: A calcium nitrate/zinc nitrate base was made to the composition below:

| Component | Mass/g |
| --- | --- |
| Water | 584 |
| Zinc Oxide | 14.3 |
| Nitric acid (70%) | 31.3 |
| Calcium nitrate (industrial) | 773.1 |
| Molasses | 7.0 |

To make the finished formulation, Sample G (35.6 g) was added with stirring to Sample H (1408 g).

Result: The finished formulation formed an emulsion, with the appearance of an almost clear, homogeneous liquid.

EXAMPLE 5

Analysis: 9.5% Ca, 1% Mg, 200 ppm DPU

Sample G: DPU (0.8 g) was dissolved in AGNIQUE® AMD10 (39.2 g) and ATLOX® 4991 (60.0 g) added to give a 0.8% w/w DPU concentrate.

Sample I: A calcium nitrate/magnesium nitrate base was made to the composition below:

| Component | Mass/g |
| --- | --- |
| Water | 520.7 |
| Magnesium nitrate hexahydrate | 149.8 |
| Calcium nitrate (industrial) | 717.5 |
| Molasses | 7.0 |

To make the finished formulation 36.3 g of Sample G is added with stirring to 1395 g of Sample I. To this is added 0.6 g Antifoam Gen (a silicone emulsion made by Lambert S.p.A) and 4.5 g water.

Result: The formulation formed an emulsion. Samples remain homogeneous and almost clear during 8 weeks storage between −18 and +40° C.

EXAMPLE 6

Analysis: 10.5% Ca, 200 ppm DPU in 1-dodecyl-2-pyrrolidone

Sample 3: DPU (0.8 g) is dissolved in 1-dodecyl-2-pyrrolidone (39.2 g) and ATLOX® 4991 (60.0 g) added to give a 0.8% w/w DPU concentrate.

35.6 g Sample J is added to 1409 g Sample H to give a slightly hazy, homogeneous emulsion. No changes were observed after 2 days storage at temperatures up to, and including, 50° C.

Application to Plants

The emulsions produced in Examples 1 to 6 will typically be applied to field crops such as soybean (*Glycine max*) as a foliar spray of an aqueous dilution, with a typical treatment rate of 0.5-1 litre per hectare.

The crop yield is expected to be increased typically by 5% compared to untreated plants.

Examples 4 to 6, comprising a higher concentration of DPU, can be expected to deliver an enhanced crop yield and/or a comparable crop yield at lower application rates, compared to Examples 1 to 3.

The invention claimed is:

1. A plant treatment composition comprising:
an aqueous phase comprising a plant nutrient;
an organic phase comprising a substituted urea compound, dissolved in an organic solvent; and
an emulsifier comprising an ethoxylated coco amine, where the ethoxylated chain length is in a range of 8 to 15 and/or an ethoxylated isotridecyl alcohol;
wherein the composition is at a pH of 1 to 4 and is in the form of an emulsion having droplets of the organic phase dispersed in the aqueous phase, the droplets having a size of less than 100 nm,
wherein the plant nutrient is water soluble and dissolved in the aqueous phase;
wherein the organic solvent has a solubility in water of less than 10 g/L and comprises or consists of capric acid dimethylamide,
wherein the substituted urea compound is selected from diphenyl urea, 2-nitro diphenyl urea, mono- or di-methyl diphenyl urea, mono- or di-ethyl diphenyl urea and 1,3-diethyl-1,3-diphenyl urea,
wherein the plant treatment composition comprises the substituted urea compound in a range of from 50 to 400 ppm, based on the total weight of the plant treatment composition,
wherein the composition further comprises from 4% to 12% w/w calcium and from 0.1% to 5% w/w zinc, based on the total weight of the plant treatment composition, and
wherein the emulsion remains homogeneous during two weeks of storage between −18 and +40° C.

2. The composition of claim 1 wherein the composition further comprises from 0.1% to 15% w/w magnesium, based on the total weight of the plant treatment composition.

3. The composition of claim 1, wherein the composition further comprises from 0.1 to 5% w/w iron, based on the total weight of the plant treatment composition.

4. The composition of claim 1, wherein the substituted urea compound is diphenyl urea (DPU).

5. The composition of claim 4 comprising from 4 to 6% w/w calcium in the aqueous phase based on the total weight of the composition and from 10 to 300 ppm diphenyl urea in the organic phase based on the total weight of the composition.

6. The composition of claim 4 comprising in the range of from 8 to 12% w/w calcium based on the total weight of the composition in the aqueous phase and in the range of from 10 to 300 ppm diphenyl urea based on the total weight of the composition in the organic phase.

7. The composition of claim 1, wherein the emulsion is a microemulsion.

8. The composition of claim 1, wherein the weight ratio of the aqueous phase to the organic phase is in a range of from 999:1 to 1:1 by weight.

9. A method of making the plant treatment composition according to claim 1, the method comprising dissolving the substituted urea in the organic solvent to form the organic phase; and dispersing droplets of the organic phase in the aqueous phase comprising a plant nutrient.

10. A method of enhancing crop yield in a plant, the method comprising exposing the plant to a composition according to claim 1.

11. The method of claim 10 wherein the plant is a soybean plant.

12. A method of treating a plant, the method comprising applying a composition according to claim 1, or an aqueous dilution thereof, to the plant.

13. The method of claim 12 wherein the composition or dilution is applied as a foliar spray.

* * * * *